(12) United States Patent
Bakker

(10) Patent No.: US 7,529,108 B2
(45) Date of Patent: May 5, 2009

(54) FULL-BRIDGE DIGITAL POWER CONVERTER CONTROLLER AND METHOD TO COMPENSATE VOLT-SECOND IMBALANCE

(75) Inventor: Anthonius Bakker, Morgan Hill, CA (US)

(73) Assignee: Analog Devices, Inc, Norwood, MA (US)

( * ) Notice: Subject to any disclaimer, the term of this patent is extended or adjusted under 35 U.S.C. 154(b) by 383 days.

(21) Appl. No.: 11/618,967

(22) Filed: Jan. 2, 2007

(65) Prior Publication Data

US 2008/0158914 A1 Jul. 3, 2008

(51) Int. Cl.
*H02H 7/122* (2006.01)
*H02M 3/335* (2006.01)
*H02M 3/24* (2006.01)
*H02M 7/44* (2006.01)

(52) U.S. Cl. .................. 363/56.02; 363/17; 363/98
(58) Field of Classification Search .............. 363/17, 363/50, 53, 55–56.03, 56.05, 98
See application file for complete search history.

(56) References Cited

U.S. PATENT DOCUMENTS

| 6,353,547 B1* | 3/2002 | Jang et al. ................ 363/17 |
| 6,356,461 B1* | 3/2002 | Jacobs ..................... 363/17 |
| 6,400,580 B1* | 6/2002 | Bowman et al. ............ 363/17 |
| 2005/0078491 A1* | 4/2005 | Song et al. ................. 363/17 |

OTHER PUBLICATIONS

"Si8250/1/2 Digital Power Controller"; Silicon Laboratories; Preliminary Rev. 0.9; Aug. 2006; pp. 1-30.
"Introduction to Forward Power Converters Utilizing Active Clamp Reset"; http://www.national.com/onlineseminar/2005/activeclamp/ActiveClamp 4-18-05b.pdf; National Semiconductor; Apr. 18, 2005; pp. 1-46.

* cited by examiner

*Primary Examiner*—Kiesha L Rose
*Assistant Examiner*—Fred E Finch, III
(74) *Attorney, Agent, or Firm*—Koppel, Patrick, Heybl & Dawson

(57) ABSTRACT

A digital controller for use with a full-bridge power converter which includes an isolation transformer that conducts first and second currents of opposite polarity during respective power-transfer phases. A current transformer senses the currents, and a non-zero current $I_{in}$ is generated when either of the first or second currents is >0. The controller includes a sigma-delta modulator arranged to integrate a current applied to its input and to modulate the integrated signal to a bitstream. $I_{in}$ is integrated by a first integrator and the bitstream is decimated to a digital word by a first decimation filter during the first power-transfer phase, and is integrated by a second integrator and decimated with a second decimation filter during the second phase. The difference between the digital values is used to adjust the pulses that operate the full-bridge switches as necessary to reduce any imbalance between the first and second currents.

22 Claims, 5 Drawing Sheets

US 7,529,108 B2

FULL-BRIDGE DIGITAL POWER CONVERTER CONTROLLER AND METHOD TO COMPENSATE VOLT-SECOND IMBALANCE

BACKGROUND OF THE INVENTION

1. Field of the Invention

This invention relates generally to the field of switching power converters, and more particularly to digital controllers and control methods for full-bridge power converters.

2. Description of the Related Art

AC-DC power supplies which provide a high power output (greater than about 400 watts) are typically implemented using a full-bridge power converter configuration. A basic implementation of such a converter is shown in FIG. 1. A full-bridge converter employs an isolation transformer 10. Four switches (A, B, C and D)—typically transistors (shown with their respective parasitic diodes)—are used to direct a current through the isolation transformer's primary windings. There are typically two phases during which power is transferred from the primary to the secondary side of transformer 10. During a first phase (phase 1), switches A and D are closed and a current having a first polarity is conducted through the primary windings. During a second phase (phase 2), switches B and C are closed and the primary windings conduct a current having a polarity opposite the first. The switches are operated with respective pulses, which are typically generated by a pulse-width modulation (PWM) circuit (not shown).

The secondary side of the isolation transformer drives a rectification circuit 12, the output of which drives an output inductor L. The power transfer phases serve to ramp the current in inductor L up (the current is ramped down during other, non-power-transferring phases), thereby generating the converter's output voltage $V_o$.

During phase 1, the voltage across the primary side of transformer 10 is equal to the input voltage (+V), and a magnetic flux is building up in the transformer. During phase 2, the transformer sees an opposite voltage (−V), thus reducing the magnetic flux. For proper operation, it is important that the durations of phase 1 and phase 2 are exactly the same, and that +V=|−V| (which may be unequal due to non-ideal switches). If this is not the case, the "volt-second balance" is disturbed, resulting in a non-zero average magnetic flux in the transformer. If this imbalance becomes too large, the magnetic core of the transformer will saturate, resulting in a very high current that can easily damage the switches and the transformer.

One method of avoiding the build-up of magnetic flux is to add a capacitor in series with the primary side of transformer 10. Now, any volt-second imbalance generates a voltage across the capacitor which acts to compensate for the imbalance. However, this method requires a capacitor having a significant size and cost, and which may pose a reliability problem.

Conventionally, the switches of a full-bridge power converter are controlled using "voltage mode control" (VMC), in which output voltage $V_o$ is compared with a reference voltage, and the error between the voltages is used to adjust the width of the pulses provided to switches A-D as needed to reduce the error. However, this control method can give rise to a volt-second imbalance and the need for a capacitor as described above.

One possible way to avoid this is to employ current mode control (CMC) instead of VMC. This method has two control loops: a voltage control loop similar to VMC, and a high-speed current control loop which measures the current in transformer 10 and provides a local feedback signal. This approach works adequately when implemented with an analog controller. However, it is difficult to implement with a digital controller.

SUMMARY OF THE INVENTION

A digital controller and control method for a full-bridge power converter are presented which overcome the problems noted above, in that any volt-second imbalance is avoided without the use of a capacitor or CMC.

The present controller is for use with a full-bridge power converter which includes an isolation transformer and a switching means operated by the controller, with the controller arranged to operate the switching means so as to conduct first and second currents of opposite polarity through the transformer's primary windings during respective power-transfer phases. Both first and second currents are returned to a common node.

The digital controller comprises a current transformer, the primary windings of which are coupled to the common node so that they conduct the first and second currents. A rectifying circuit is coupled to the current transformer's secondary windings, and provides a DC voltage $V_{in}$ at an output when either of the first or second currents is greater than zero. The controller also includes 1) a sigma-delta modulator having first and second integrators and arranged to integrate a voltage applied to its input and to modulate the integrated signal to a bitstream, 2) first and second decimation filters, and 3) a switching network.

The switching network is arranged such that $V_{in}$ is integrated by the first integrator and the bitstream is decimated to a digital word by the first decimation filter during the first power-transfer phase, and $V_{in}$ is integrated by the second integrator and the bitstream decimated to a digital word by the second decimation filter during the second phase. The controller is arranged such that the difference between the values represented by the digital words increases with the magnitude of any imbalance between the first and second currents, which results from a volt-second imbalance. These values are subtracted and the difference fed back to the PWM generation circuitry, which adjusts the pulses used to operate the full-bridge switches as necessary to reduce the current imbalance, and thereby any volt-second imbalance.

These and other features, aspects, and advantages of the present invention will become better understood with reference to the following drawings, description, and claims.

DETAILED DESCRIPTION OF THE INVENTION

Figure 1:
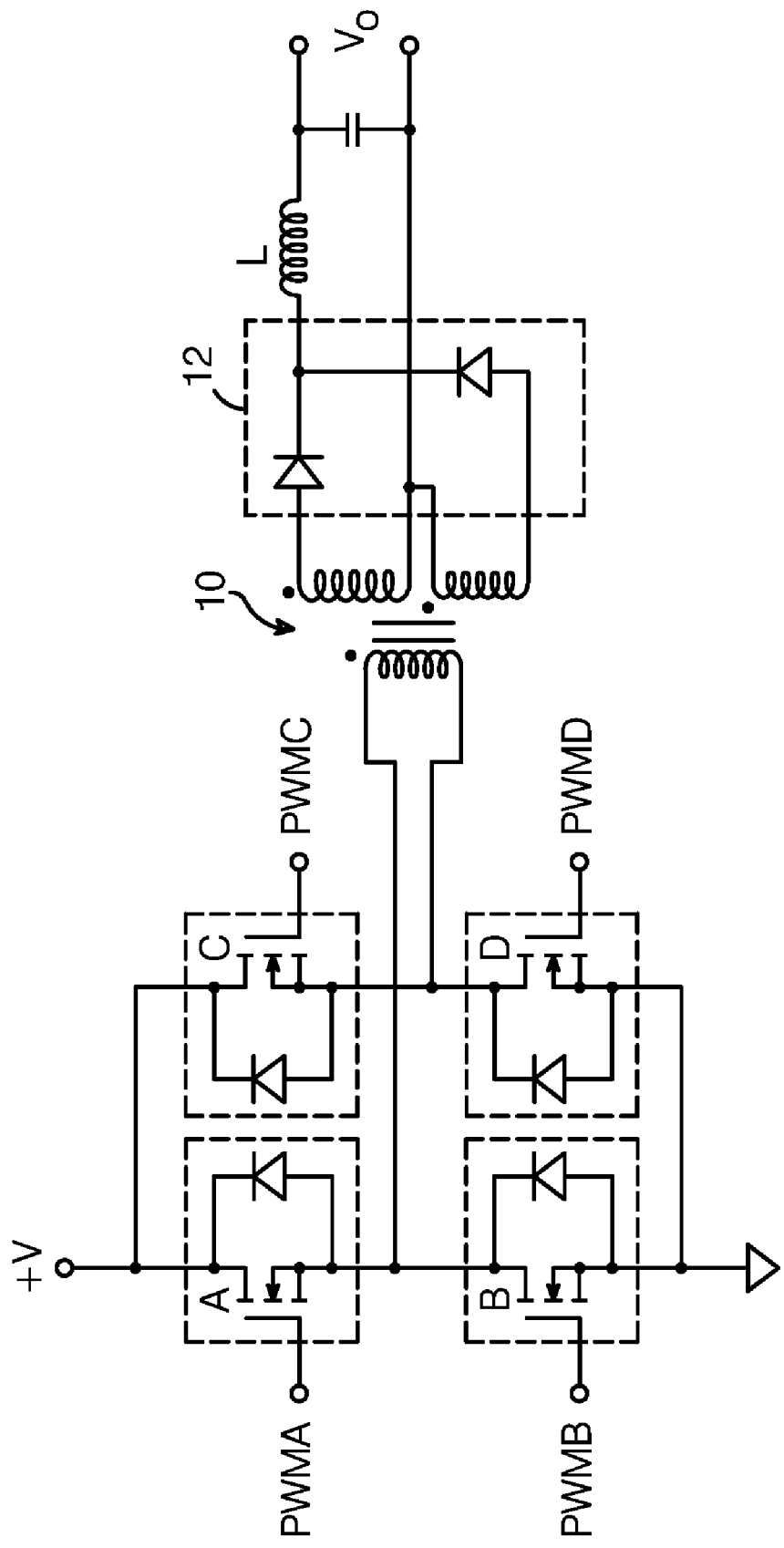
FIG. 1 is schematic diagram of a known full-bridge power converter.
Figure 2:
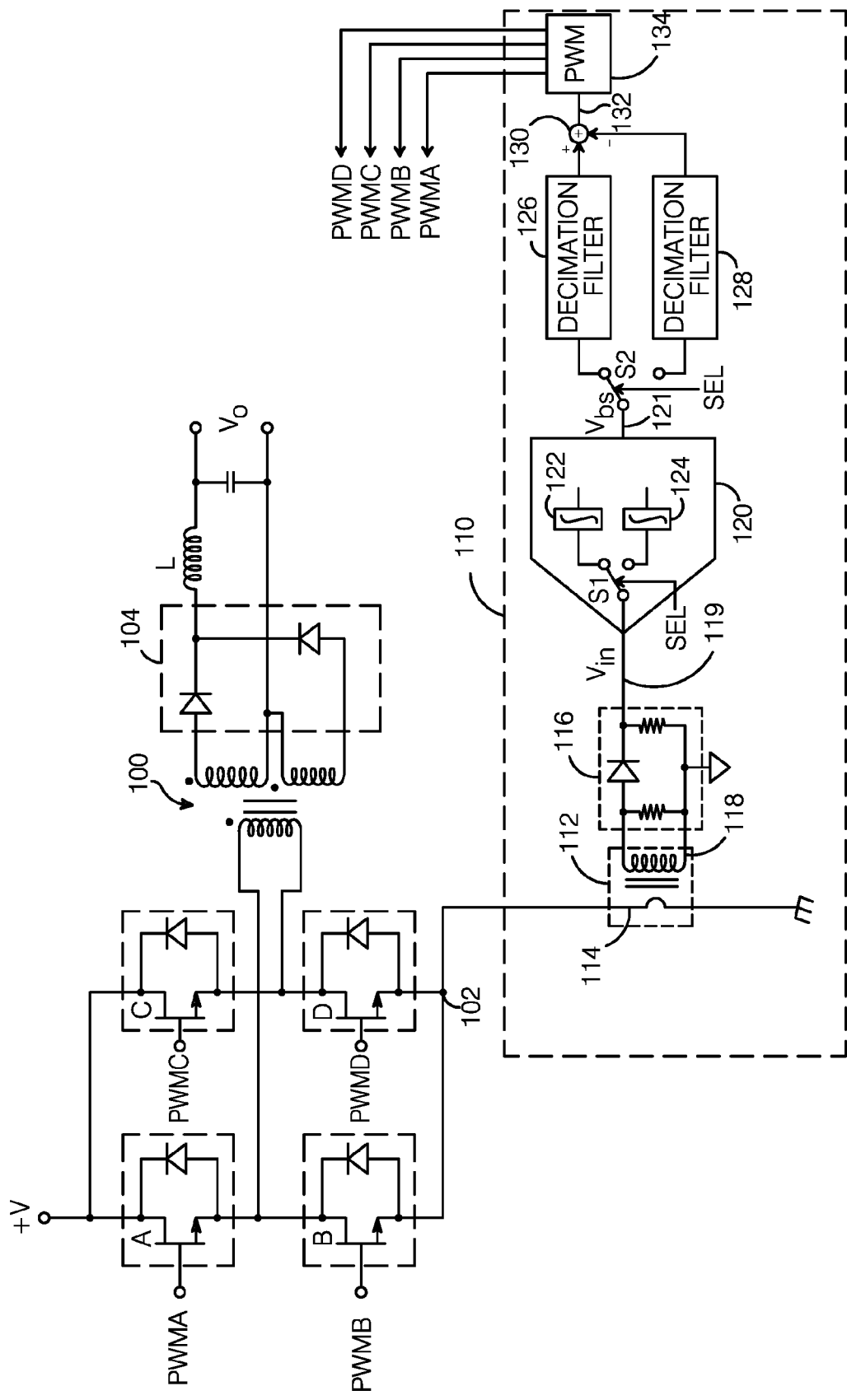
FIG. 2 is block/schematic diagram of a full-bridge power converter which employs a digital controller in accordance with the present invention.

A full-bridge power converter which employs a digital controller in accordance with the present invention is shown in FIG. 2. The converter includes an isolation transformer 100, and four switches (A, B, C and D)—typically transistors (shown with their respective parasitic diodes)—are used to direct a current through the isolation transformer's primary windings. During a first power-transfer phase (phase 1), switches A and D are closed and a first current having a first polarity is conducted through the transformer's primary windings. During a second power-transfer phase (phase 2), switches B and C are closed and a second current having a polarity opposite the first is conducted through the primary windings. The switches are arranged such that the first and second currents are both returned to a common node 102. The switches are operated with respective pulses, which are typically generated by a pulse-width modulation (PWM) circuit.

The secondary side of isolation transformer 100 drives a rectification circuit 104, the output of which drives an output inductor L. The power transfer phases serve to ramp the current in inductor L up, thereby generating the converter's output voltage $V_o$. Note that the secondary side can use any of a number of different rectifier configurations, including the current doubler arrangement shown, a conventional rectifier, synchronous rectifiers, etc.

Switches A-D are operated by a digital controller 110. The controller includes a current transformer 112, the primary windings of which (114) are coupled to common node 102 such that they conduct the isolation transformer's first and second currents. Preferably, only one primary winding is used, so as to keep the voltage drop on the primary side of the current transformer as low as possible to avoid losses. A rectifying circuit 116 is coupled to the secondary windings (118) of current transformer 112, which provides a DC voltage $V_{in}$ at an output when either of the first or second currents is greater than zero. Thus, $V_{in}$ alternately varies with the current conducted by the isolation transformer's primary windings during phase 1 and phase 2.

DC voltage $V_{in}$, or, preferably, a current $I_{in}$ which varies with $V_{in}$ (as discussed below) is applied to the input 119 of a sigma-delta modulator 120, which is arranged to integrate $I_{in}$ and to modulate the integrated signal to a bitstream ($V_{bs}$) provided at an output 121. Modulator 120 includes first and second integrator circuits 122 and 124, and a switch S1 which directs $I_{in}$ to one or the other of the integrators. The controller also includes a first and second decimation filters 126 and 128, and a switch S2 which directs $V_{bs}$ to one or the other of the decimation filters.

S1 and S2 are operated with a signal "SEL" which toggles in sync with and at the same switching frequency ($F_{SW}$) as switches A-D. During phase 1, $I_{in}$ is directed (via S1) to and integrated by integrator 122, and bitstream $V_{bs}$ is directed (via S2) to decimation filter 126, which decimates $V_{bs}$ to a digital word. During phase 2, $I_{in}$ is directed to and integrated by integrator 124, and bitstream $V_{bs}$ is directed to decimation filter 128, which decimates $V_{bs}$ to a digital word. The controller is arranged such that the difference between the values represented by the digital words produced by filters 126 and 128 increases with the magnitude of any imbalance between the first and second currents, which results from a volt-second imbalance associated with isolation transformer 100.

The difference between the digital word values is used to adjust the widths of the pulses driving switches A-D so as to eliminate any current imbalance, and thereby any volt-second imbalance. One way in which this can be accomplished is with the use of a digital subtraction circuit 130 which receives the digital words as inputs and produces an output 132 which varies with their difference. This difference value is provided to a PWM generator circuit 134, which is arranged to generate and adjust the pulses (PWMA-PWMD) delivered to switches A-D as necessary to reduce the difference such that any volt-second imbalance is reduced or eliminated. When so arranged, switches A-D and digital controller 110 form a control loop, the bandwidth of which can be much lower than the switching frequency at which switches A-D are operated.

The analog-to-digital converter (ADC) function performed by the sigma-delta modulator and decimation filter as described above could alternatively be performed with a high-speed, high-resolution ADC. However, such an ADC typically has a high cost, and may exhibit accuracy issues associated with noise from the current transformer. In contrast, the configuration described herein can be provided at low cost, and has a much higher linearity than conventional ADCs. The additional cost of adding a second integrator is negligible compared with the cost of a high-speed ADC that would otherwise be required to sample and compare the sensed currents within one switching period.

A drawback of sigma-delta ADCs is their slow speed, which can prevent them from being used in applications requiring a sampling speed on the order of several hundred kHz, as would be case for a conventional implementation of the volt-second balance control method described herein. The present invention overcomes this by separating the phase 1 and phase 2 current signals in the bitstream domain, while the control of the pulse widths is done after the decimation, so that the control loop bandwidth can be much lower than switching frequency $F_{SW}$.

Figure 3:
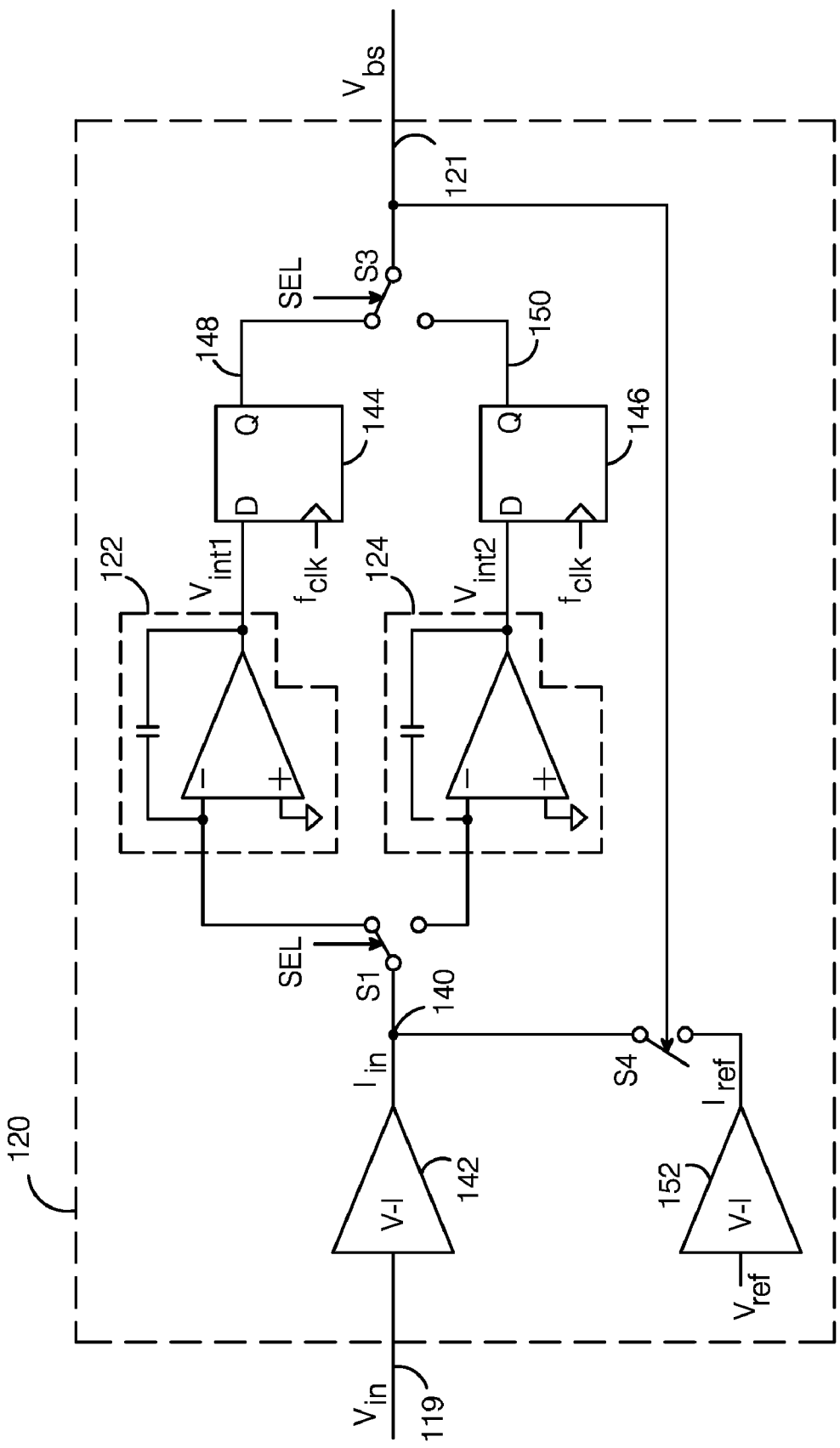
FIG. 3 is a schematic diagram of a sigma-delta modulator as might be used in a digital controller per the present invention.

One possible implementation of sigma-delta modulator 120 in accordance with the present invention is shown in FIG. 3. As noted above, the modulator includes two integrators 122 and 124, each of which is suitably implemented with an op amp and a capacitor. Switch S1 connects a node 140 that varies with $V_{in}$ to either integrator 122 or 124. $V_{in}$ is preferably buffered with a voltage-to-current converter 142, with the current output signal ($I_{in}$) provided at node 140.

To avoid having the modulator oscillate at a frequency determined by parasitic capacitances, and to synchronize the output signals to a sampling clock $f_{CLK}$, the modulator includes first and second delay elements 144 and 146. Delay element 144 receives the output ($V_{int1}$) of integrator 122 at an input, and provides an output 148, while delay element 146 receives the output ($V_{int2}$) of integrator 124 at an input, and provides an output 150. Each of the delay elements is preferably implemented with a D flip-flop, which is clocked with sampling clock $f_{CLK}$. The outputs 148, 150 of the respective delay elements are coupled to a switch S3, which is part of the switching network along with S1 and S2, and which operates synchronously with S1 and S2 at switching frequency $F_{SW}$. Switch S3 connects the output of delay element 144 or 146 to node 121 to form the bitstream voltage $V_{bs}$.

To set the dynamic range of $V_{in}$, a reference voltage $V_{ref}$ is preferably provided to the modulator, and summed with $V_{in}$ when the bitstream is at a logic 'high' state. $V_{ref}$ is preferably provided to a voltage-to-current converter 152 in the same manner as $V_{in}$, which outputs a current output $I_{ref}$. The summing is accomplished with a switch S4, which is arranged to close when $V_{bs}$ is 'high'. When so arranged, bitstream voltage $V_{bs}$ is given by:

$$V_{bs} = I_{in}/I_{ref} = V_{in}/V_{ref}$$

Referring back to FIG. 2, bitstream voltage $V_{bs}$ is provided to decimation filters 126 or 128 via S2, which operates synchronously with S1 and S3 at switching frequency $F_{SW}$. Decimation filters 126 and 128 are preferably implemented with first and second counters having respective data inputs and which are clocked with sampling clock $f_{CLK}$. The counters receive the bitstream via S2 at their respective data inputs, and count the number of 'ones' in the bitstream.

Figure 4:
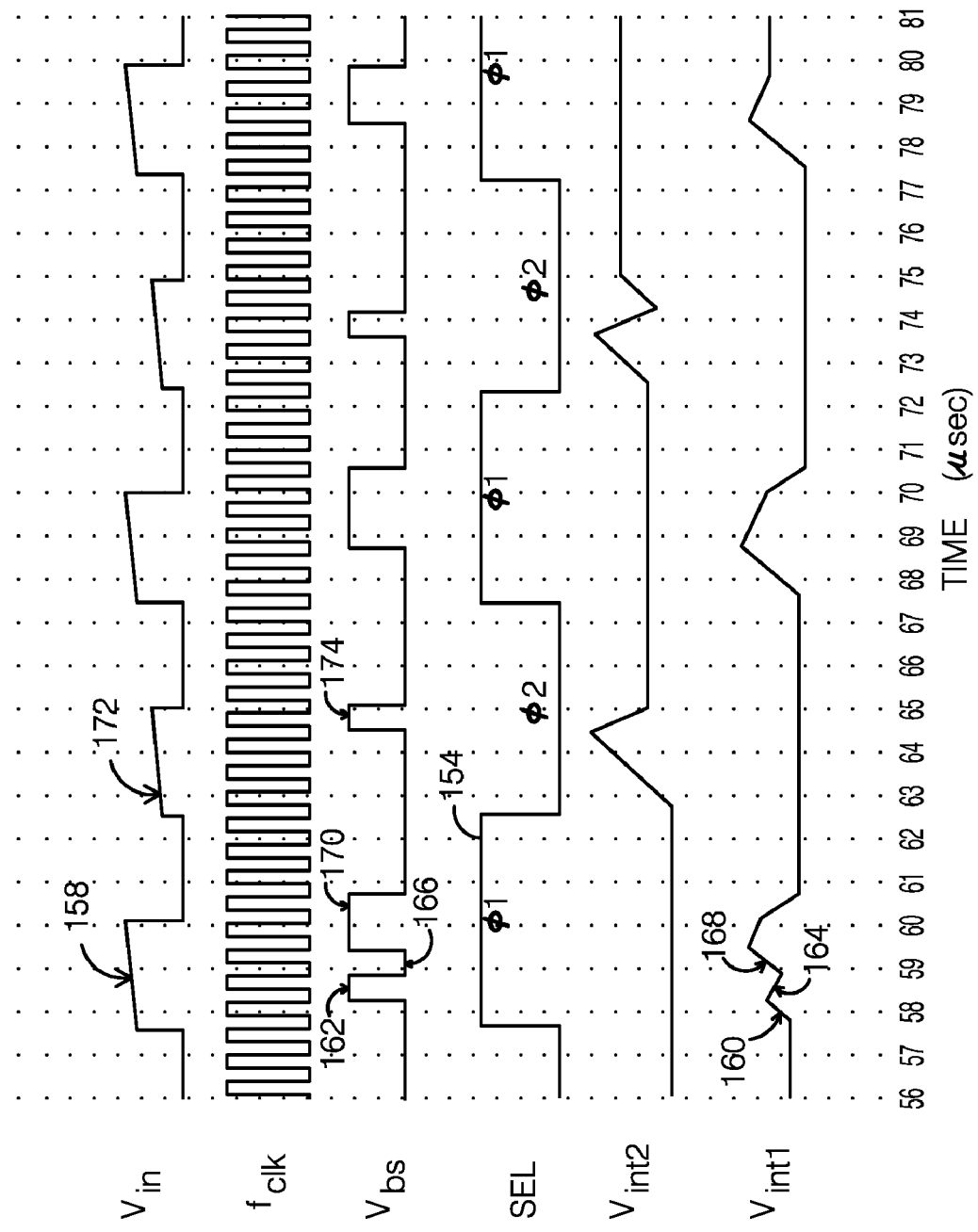
FIG. 4 is a timing diagram illustrating the operation of a sigma-delta modulator per the present invention.

A timing diagram illustrating the operation of modulator 120 over several cycles is shown in FIG. 4; each cycle which includes a phase 1 and a phase 2 as described above. During phase 1 (154), select signal SEL is 'high', such that switch S1 directs current output $I_{in}$ to integrator 122, switch S3 directs the output of delay element 144 to bitstream output 121, and S2 directs bitstream voltage $V_{bs}$ to decimation filter 1. The non-zero $I_{in}$ value (158) causes $V_{int1}$ to start increasing (160). When $V_{int1}$ becomes greater than a predetermined threshold voltage and $f_{CLK}$ toggles high, D flip-flop 144 latches a logic '1' (162), which becomes part of bitstream output $V_{bs}$.

When $V_{bs}$ goes 'high', switch S4 is closed such that $I_{ref}$ is summed with $I_{in}$. $V_{ref}$ is selected such that closing S4 will cause $V_{int1}$ to start decreasing (164), so that $V_{int}$ is kept within the dynamic range of integrator 122. If $V_{int1}$ falls below the threshold voltage by the time of the next $f_{CLK}$, $V_{bs}$ will go low (166) and S4 will open, and if $I_{in}$ is still non-zero, $V_{int1}$ will again start to increase (168). If $V_{int1}$ increases above the threshold, $V_{bs}$ will again go high (170) and close S4 on the next $f_{CLK}$. In this case—since $V_{int1}$ remains above the threshold voltage even after S4 is closed—$V_{bs}$ remains high for two $f_{CLK}$ periods, such that the bitstream contains two logic '1' values. Thus, for this example, three logic '1' values are produced during phase 1. The bitstream is decimated by decimation filter 1 as described above, by keeping a count of the logic '1' values.

The same sequence of events occurs during phase 2. In the example shown in FIG. 4, $V_{in}$ is at a lower level during phase 2 (172) than it was during phase 1. As such, $V_{int2}$ only increases enough to generate a single logic '1' (174) in the bitstream, which is counted by decimation filter 2.

Note that the signals depicted in FIG. 4 are merely exemplary. The actual values of $V_{in}$, $I_{in}$, $V_{int1}$, $V_{int2}$, and $V_{bs}$ each vary with the magnitude of the current conducted by the primary windings of current transformer 112.

Only a small number of 'ones' will occur during a given period (which consists of a phase 1 and a phase 2)—generally less than three. As such, if a conventional sigma-delta modulator were used, its resolution would be limited to about three or four levels. This is because the modulator's single integrator would need to be reset at the end of each phase, thereby losing any information that is stored on the integrator at the end of the phase—hence significantly limiting the modulator's resolution and accuracy.

However, when the sigma-delta modulator is configured with two integrators as described herein, the residual error—i.e., any signal not big enough to be converted to a logic '1'—is stored on the integrator and used in the next period, during the time the other integrator is integrating the other current sense signal. In this way, no information is lost. This enables one to use a sigma-delta converter that has a bandwidth (after counting) of much less than $F_{SW}$, but which can still be used to separate current sense signals that have a frequency that is much higher than $F_{SW}$. The use of two integrators also avoids any possibility of mixing the $V_{in}$ signals that arise due to the phase 1 current versus the phase 2 current.

The digital words produced by decimation filters 126 and 128 represent the current conducted through the isolation transformer's primary windings during phase 1 and phase 2, respectively. To avoid any volt-second imbalance, the values represented by these two digital words should be equal. Thus, the controller determines the difference between the two values, using a digital subtraction circuit 130 for example, and this difference value is used to control the operation of PWM generation circuit 134 so as to reduce and ideally eliminate the difference.

Figure 5:
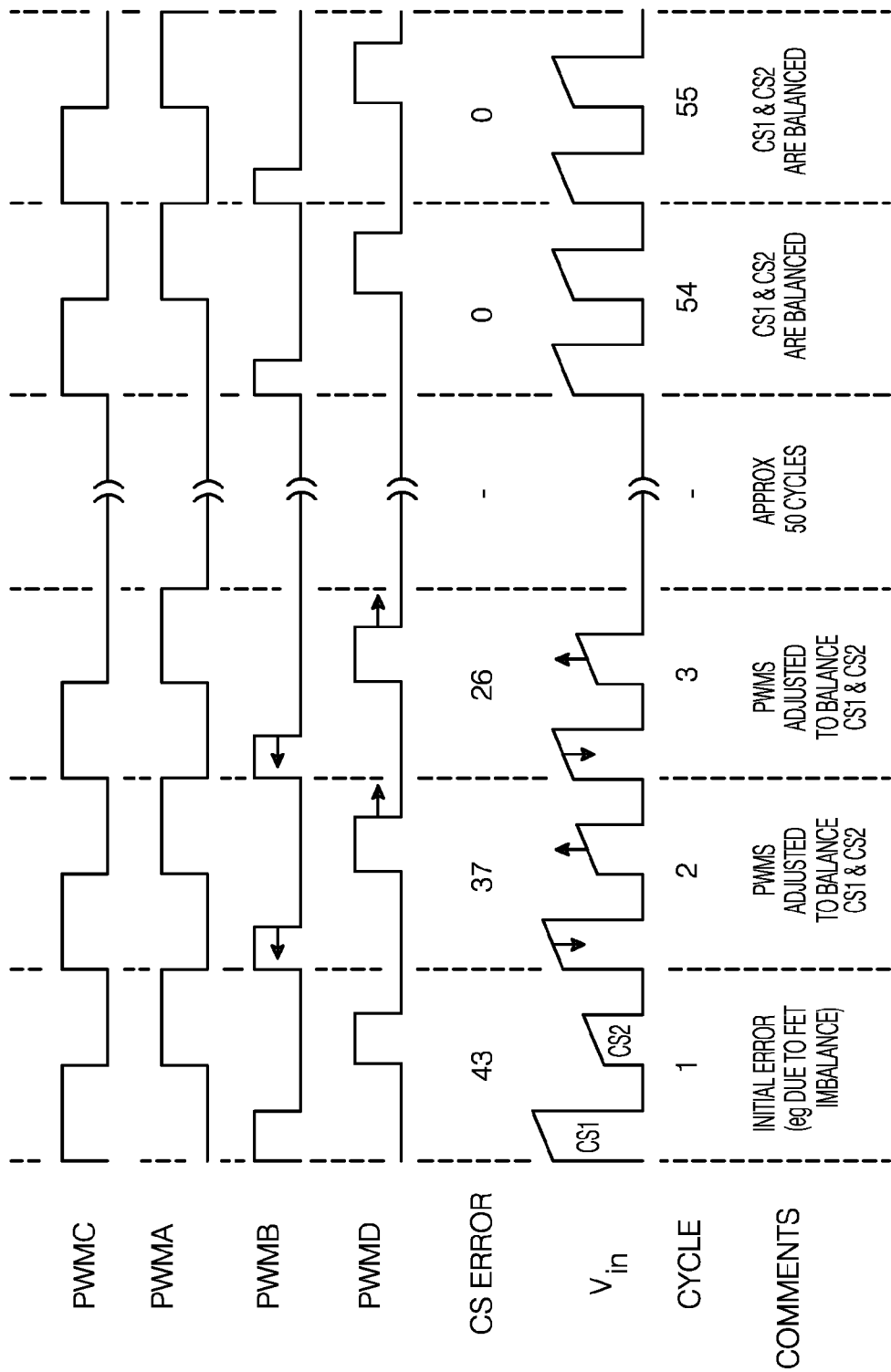
FIG. 5 is a timing diagram illustrating the operation of a control loop which includes a digital controller per the present invention.

An illustration of the operation of the control loop as it reduces volt-second imbalance is shown in FIG. 5. Initially (cycle 1), the current conducted through the isolation transformer's primary windings during phase 1 ('CS1') is greater than that during phase 2 ('CS2'). This could be due to a number of reasons; for example, a mismatch between the impedances of switches A-D. The difference between the values represented by the two digital words stored in decimation filters 1 and 2 is determined; for this example, the difference between the counts representing the sensed currents (CS ERROR) is 43 at this instant in time.

In the next cycle (cycle 2), PWM generation circuit 134 adjusts the pulses driving switches A-D so as to reduce CS ERROR. In this example, the width of the PWMB drive signal is reduced (thereby reducing CS1), while the width of the PWMD drive signal is increased (thereby increasing CS2). This has the effect of reducing CS ERROR to 37.

Additional adjustments are made to PWMB and PWMD during cycle 3, which further reduces CS ERROR to 26. This process continues in this way, and eventually, in cycle 54 of this example, the difference between the digital word values is driven to zero and any volt-second imbalance is eliminated. The controller continues to operate as described herein to continuously drive any non-zero difference that arises toward zero.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A digital controller for use with a full-bridge power converter which includes an isolation transformer and a switching means operated by said controller, said controller arranged to operate said switching means so as conduct first and second currents of opposite polarity through said isolation transformer's primary windings during respective power-transfer phases, said first and second currents both returned to a common node, said controller comprising:
   a current sensing means which generates a non-zero voltage $V_{in}$ when either of said first or second currents is greater than zero;
   a sigma-delta modulator arranged to integrate a signal applied to its input and modulate the integrated signal to a bitstream, said modulator comprising:
      a first integrator; and
      a second integrator;
   a first decimation filter;
   a second decimation filter; and
   a switching network arranged such that a signal which varies with $V_{in}$ is integrated by said first integrator and said bitstream is decimated to a digital word by said first decimation filter during said first power-transfer phase, and such that said signal which varies with $V_{in}$ is integrated by said second integrator and said bitstream is decimated to a digital word by said second decimation filter during said second power-transfer phase, such that the difference between the values represented by said digital words increases with the magnitude of any imbalance between said first and second currents.

2. The controller of claim 1, further comprising:
   a means for determining the difference between the values represented by said digital words; and a means for operating said switching means as necessary to reduce said difference.

3. The controller of claim 2, wherein said means for determining said difference comprises a digital subtraction circuit.

4. The controller of claim 2, wherein said means for operating said switching means comprises a pulse-width modulation (PWM) circuit.

5. The controller of claim 4, wherein said switching means comprises four switches, each of which includes a control input and is arranged to close for the duration of a pulse applied to said control input, said switches arranged such that two of said switches are closed when said first current is applied through said isolation transformer's primary windings and the other two are closed when said second current is applied through said isolation transformer's primary windings, said PWM circuit arranged to generate and adjust said pulses provided to said switches as necessary to reduce said difference.

6. The controller of claim 1, wherein said current sensing means comprises:
a current transformer, the primary windings of which are coupled to said common node such that they conduct said first and second currents; and
a rectifying circuit coupled to the secondary windings of said current transformer and arranged to provide said voltage $V_{in}$ at an output when either of said first or second currents is greater than zero.

7. The controller of claim 1, wherein said sigma-delta modulator further comprises:
a sampling clock;
a first delay element arranged to latch the output of said first integrator when said sampling clock toggles and said first integrator output is greater than a predetermined threshold voltage; and
a second delay element arranged to latch the output of said second integrator when said sampling clock toggles and said second integrator output is greater than a predetermined threshold voltage;
said switching network arranged to apply said signal which varies with $V_{in}$ to the input of first integrator and to connect the output of said first delay element to said first decimation filter during said first power-transfer phase, and to apply said signal which varies with $V_{in}$ to the input of second integrator and to connect the output of said second delay element to said second decimation filter during said second power-transfer phase.

8. The controller of claim 7, wherein each of said delay elements comprises a D flip-flop which is clocked with said sampling clock.

9. The controller of claim 7, further comprising a reference voltage $V_{ref}$ which is switchably connected to $V_{in}$ when said bitstream is at a logic 'high' state such that the average value of the bitstream is given by $V_{in}/V_{ref}$.

10. The controller of claim 9, further comprising:
a first voltage-to-current converter arranged to receive $V_{in}$ at an input and to provide a current output $I_{in}$ at an output, said current output $I_{in}$ provided to said integrator inputs via said switching network;
a second voltage-to-current converter arranged to receive $V_{ref}$ at an input and to provide a current output $I_{ref}$ at an output; and
a switch connected between $I_{ref}$ and $I_{in}$ which is arranged to be closed when said bitstream is at a logic 'high' state such that the average value of the bitstream is given by $I_{in}/I_{ref}$.

11. The controller of claim 1, wherein the primary windings of said current transformer comprise a single winding.

12. The controller of claim 1, wherein said first and second decimation filters comprise respective counters, each of which has a data input and is driven by a sampling clock, said bitstream connected to the data input of said first or second counter via said switching network.

13. The controller of claim 1, further comprising:
a means for determining the difference between the values represented by said digital words; and
a means for operating said switching means as necessary to reduce said difference;
wherein said switching means and said controller form a control loop having an associated bandwidth and said switching means switch between said first and second phases at a switching frequency $F_{sw}$, said controller arranged such that said control loop bandwidth is much less than $F_{sw}$.

14. The controller of claim 1, further comprising:
a rectifier circuit coupled to the secondary windings of said isolation transformer; and
an output inductor coupled to the output of said rectifier circuit.

15. A digital controller for use with a full-bridge power converter which includes an isolation transformer and a switching means operated by said controller, said controller arranged to operate said switching means so as conduct first and second currents of opposite polarity through said isolation transformer's primary windings during respective power-transfer phases, said first and second currents both returned to a common node, said controller comprising:
a current transformer, the primary windings of which are coupled to said common node such that it conducts said first and second currents;
a rectifying circuit coupled to the secondary windings of said current transformer and arranged to provide a voltage $V_{in}$ at an output when either of said first or second currents is greater than zero;
a first voltage-to-current converter which receives $V_{in}$ at an input and produces a current output $I_{in}$ at an output;
a sigma-delta analog-to-digital converter comprising:
a sigma-delta modulator arranged to integrate a signal applied to its input and modulate the integrated signal to a bitstream, said modulator comprising:
a sampling clock;
a first integrator;
a first delay element arranged to latch the output of said first integrator when said sampling clock toggles and said first integrator output is greater than a predetermined threshold voltage, said latched output being a first bitstream;
a second integrator; and
a second delay element arranged to latch the output of said second integrator when said sampling clock toggles and said second integrator output is greater than a predetermined threshold voltage, said latched output being a second bitstream;
a first counter which is clocked by said sampling clock;
a second counter which is clocked by said sampling clock;
a switching network arranged such that $I_{in}$ is integrated by said first integrator and said first bitstream is decimated to a digital word by said first counter during said first power-transfer phase, and such that $I_{in}$ is integrated by said second integrator and said second bitstream is decimated to a digital word by said second counter during said second power-transfer phase, such that the difference between the values represented by said digital words increases with the magnitude of any imbalance between said first and second currents;

a reference voltage $V_{ref}$;

a second voltage-to-current converter which receives $V_{ref}$ at an input and produces a current output $I_{ref}$ at an output, said current output $I_{ref}$ switchably connected to $I_{in}$ when the bitstream being decimated is at a logic 'high' state such that the average value of the voltage of the bitstream being decimated is given by $I_{in}/I_{ref}$;

a digital subtraction circuit arranged to determine the difference between the digital words provided by said first and second counters; and a pulse-width modulation (PWM) circuit arranged to operate said switching means as necessary to reduce said difference.

16. The controller of claim 15, wherein said switching means comprises four switches, each of which includes a control input and is arranged to close for the duration of a pulse applied to its control input, said switches arranged such that two of said switches are closed when said first current is applied through said isolation transformer's primary windings and the other two switches are closed when said second current is applied through said isolation transformer's primary windings, said PWM circuit arranged to provide pulses to each of said switches.

17. The controller of claim 15, wherein each of said delay elements comprises a D flip-flop which is clocked with said sampling clock.

18. The controller of claim 15, further comprising:
a rectifier circuit coupled to the secondary windings of said isolation transformer; and
an output inductor coupled to the output of said rectifier circuit.

19. A full-bridge power converter, comprising:
a digital controller;
an isolation transformer;
a switching means operated by said controller, said controller arranged to operate said switching means so as conduct first and second currents of opposite polarity through said isolation transformer's primary windings during respective power-transfer phases, said first and second currents both returned to a common node;
a rectifier circuit coupled to the secondary windings of said isolation transformer; and
an output inductor coupled to the output of said rectifier circuit; said digital controller comprising:

a current sensing means which generates a non-zero voltage $V_{in}$ when either of said first or second currents is greater than zero;
a sigma-delta modulator arranged to integrate a signal applied to its input and modulate the integrated signal to a bitstream, said modulator comprising:
a first integrator; and
a second integrator;
a first decimation filter;
a second decimation filter; and
a switching network arranged such that a signal which varies with $V_{in}$ is integrated by said first integrator and said bitstream is decimated to a digital word by said first decimation filter during said first power-transfer phase, and such that said signal which varies with $V_{in}$ is integrated by said second integrator and said bitstream is decimated to a digital word by said second decimation filter during said second power-transfer phase, such that the difference between the values represented by said digital words increases with the magnitude of any imbalance between said first and second currents.

20. A method of controlling the switching of a full-bridge power converter having an isolation transformer and a switching means which conduct first and second currents of opposite polarity through said isolation transformer's primary windings during respective power-transfer phases, said method comprising:
generating a non-zero current $I_{in}$ when either of said first or second currents is greater than zero;
integrating $I_{in}$, modulating the integrated signal to a bitstream, and decimating said bitstream to a digital word during said first power-transfer phase;
integrating $I_{in}$, modulating the integrated signal to a bitstream, and decimating said bitstream to a digital word during said second power-transfer phase;
such that the difference between the values represented by said digital words increases with the magnitude of any imbalance between said first and second currents.

21. The method of claim 20, wherein said first and second integrating steps are performed with separate integrators.

22. The method of claim 20, further comprising:
determining the difference between the values represented by said digital words; and
operating said switching means as necessary to reduce said difference.

* * * * *